United States Patent [19]
Suzuki et al.

[11] Patent Number: 6,060,800
[45] Date of Patent: May 9, 2000

[54] MOTOR STRUCTURE

[75] Inventors: Yuzuru Suzuki; Sakae Fujitani; Hiroto Nakamata; Haruyoshi Hino, all of Asaba-cho, Japan

[73] Assignee: Minebea Co., Ltd., Nagano, Japan

[21] Appl. No.: 09/072,838

[22] Filed: May 5, 1998

Related U.S. Application Data

[63] Continuation-in-part of application No. 08/667,823, Jun. 20, 1996, abandoned.

[30] Foreign Application Priority Data

Jul. 12, 1995 [JP] Japan .................................. 7-197970

[51] Int. Cl.$^7$ .................................................. H02K 37/14
[52] U.S. Cl. ........................ 310/49 R; 310/257; 310/156; 310/51
[58] Field of Search .................................. 310/257, 156, 310/51; 300/89, 90, 91, 49 R, 67 R, 157; 360/99.08, 99.09, 99.07, 99.11

[56] References Cited

U.S. PATENT DOCUMENTS

| | | | |
|---|---|---|---|
| 3,549,918 | 12/1970 | Croymans et al. | 310/49 R |
| 4,471,246 | 9/1984 | Paillet | 310/42 |
| 5,177,384 | 1/1993 | Furuki | 310/49 R |
| 5,291,084 | 3/1994 | Shiotsuki et al. | 310/49 R |
| 5,410,200 | 4/1995 | Sakamoto et al. | 310/49 R |

FOREIGN PATENT DOCUMENTS

| | | | |
|---|---|---|---|
| 0468763 | 1/1992 | European Pat. Off. . | |
| 468763 | 1/1992 | European Pat. Off. | 310/49 R |
| 0074048 | 3/1992 | European Pat. Off. | H02K 37/14 |
| 0074048 A1 | 3/1992 | European Pat. Off. . | |
| 63-136949 | 6/1988 | Japan | 310/49 R |
| 63-242159 | 10/1988 | Japan | 310/49 R |
| 5-161334 | 6/1991 | Japan | 310/49 R |
| 6-14515 | 6/1992 | Japan | 310/49 R |
| 4-185271 | 7/1992 | Japan | 310/49 R |
| 4-244775 | 9/1992 | Japan | H02K 37/14 |
| 5-161333 | 6/1993 | Japan | 310/49 R |
| 6-14515 | 1/1994 | Japan | H02K 37/14 |
| 61-4459 | 1/1994 | Japan | 310/49 R |
| 61-4459 | 6/1994 | Japan . | |
| 8-51754 | 2/1996 | Japan | H02K 37/14 |
| 8-205510 | 8/1996 | Japan | H02K 37/14 |
| 92538 | 10/1958 | Norway | 310/257 |
| 2211030 | 6/1989 | United Kingdom | 310/49 R |
| 2245768 | 1/1992 | United Kingdom . | |

OTHER PUBLICATIONS

T. Kenjo: "Steping Motors and Their Microcprocessor Controls"; 1984; pp. 40–45; Monographs in Electrical and Electronic Engineering 16.

Patent Abstracts of Japan, vol. 017, No. 013 (E–1304), Jan. 11, 1993 and JP 04 244775 A (Aisan Ind. Co. Ltd.), Sep. 1, 1992, *Abstract*.

*Primary Examiner*—Nestor Ramirez
*Assistant Examiner*—Burton S. Mullins
*Attorney, Agent, or Firm*—Frishauf, Holtz, Goodman, Langer & Chick, P.C.

[57] ABSTRACT

A claw pole type synchronous motor has two cylindrical stator assembles arranged back-to-back and a magnetized rotor provided coaxially with the stator assemblies. The rotor has a length larger than the total thickness of the stator assemblies and always covers the inner peripheral surfaces of the stator assemblies so as to reduce vibration due to axial movements of the rotor with respect to the stator assemblies. The motor also has an electrical phase angle defined between the center lines of the corresponding claw poles of the adjacent stator assemblies made equal to the theoretical electrical phase angle minus an electrical angel within a range more than 0° and less than 10°.

9 Claims, 6 Drawing Sheets

MOTOR STRUCTURE

CROSS-REFERENCE TO RELATED APPLICATIONS

The present application is a continuation-in-part application of patent application Ser. No. 08/667,823 filed on Jun. 20, 1996 now abandoned.

BACKGROUND OF THE INVENTION

1. Field of the Invention

The present invention relates to a claw pole type synchronous motor and more particularly to a claw pole type stepping motor.

2. Description of the Prior Art

A claw pole type synchronous motor including a PM type two-phase stepping motor has been used widely because it has an excellent feature that it can be manufactured at a low cost. One of typical conventional claw pole type stepping motors is disclosed in Takashi Kenjo: "Stepping motors and their microprocessor controls", page 40 to 43, Oxford University Press, 1986 (Reprint).

A two-phase stepping motor which is a claw pole type synchronous motor has two stator assemblies comprising an A-phase stator assembly and a B-phase stator assembly having the same structure and coaxially arranged back-to-back, and claw poles formed circumferentially at equal intervals on each stator assembly.

In the conventional stepping motor of this type, the magnetized rotor is moved axially thereof every time the coils are excited. Since the length of the rotor is substantially equal to the distance between the upper surface of the upper stator assembly and the lower surface of the lower stator assembly, the axial movement induces magnetic variations between the rotor and the rotor assemblies. This produces adverse vibration of the motor.

In order to reduce vibration in the conventional motor, the claw poles are indexed on the A-phase and B-phase stator assemblies and are arranged back-to-back so that the separation angles between the center lines of the adjacent claw poles of both stator assemblies (i.e., the relative angle defined between the claw poles of the A-phase and B-phase) are made as accurately as equal as possible to the mechanical angle of 360°/N(N being the number of steps) which is equivalent to an electric angle equal to N/4 times the corresponding mechanical angle.

In spite of such strict control of the separation angles, vibration is generated every time the motor moves by one step. Further, the reduction of the vibration is limited due to the fact that ripples are large because the sum of squares of the wave form of the BEMFs (back-electromotive forces) is not linear. This limitation has been compensated to some extent by use of a frequency reduction device other than the motor.

In the course of recent advancement of the optical technology, recording devices which perform high density recording have been developed. Although having an excellent feature that the motor can be manufactured at a low cost, the conventional claw pole type stepping motor cannot have been used on such a highly efficient recording device, since occurrence of vibration in the motor must be strictly prevented.

SUMMARY OF THE INVENTION

The object of the present invention is to provide a claw pole type synchronous motor which can rotate smoothly with little vibration by preventing axial movement of the rotor magnet and making the electrical separation angle between the center lines of the claw poles of the adjacent stator assemblies at both phases smaller by an electrical angle within the predetermined angular range than the theoretical electrical phase angle (the electrical step angle).

In order to achieve the object of the present invention, a claw pole type synchronous motor comprises a rotary rotor having two ends and an axis; a multi-pole magnetized permanent magnet provided coaxially with the rotor and fixed thereto; a plurality of stator assemblies having cylindrical inner peripheral areas and arranged back-to-back one after another and coaxial with the rotor so as to form a multi-stator assembly having two end surfaces defining a total thickness therebetween; claw poles formed so as to face the rotor and arranged in parallel with the axis of the rotor on each of the stator assemblies and circumferentially at equal intervals; the rotor having a length larger than the total thickness of the multi-stator assembly and disposed in such a way that each of the two ends of the rotor always extends from the corresponding one of the end surfaces of the multi-stator assembly; and an electrical separation angle of $(\theta_E/2+\alpha_E)$ defined between center lines of the corresponding claw poles of the stator assemblies in such a way that $\theta_E/2$ is an electrical angle of 90° and $\alpha_E$ is in an electrical angle range of $-10°<\alpha_E<0°$, for reduction of vibration of the motor.

With the motor according to the present invention, provision of compression coil spring for making the rotor always cover the cylindrical inner peripheral areas of the stator assemblies ensures the prevention of the axial movement of the rotor, whereby oscillation of the motor is remarkably reduced.

Further, the wave form of the sum of squares of BEMFs (back-electromotive force) excited in the coil at each phase is linear and ripples are small. Thus, vibration is reduced to allow the motor to rotate smoothly. This is because the sum of squares of the BEMFs at each phase is proportional to the magnitude of the rotational torque which is applied to the rotor (magnet) at any position when the wave form is sinusoidal, and the more linear the wave form, the more uniform the rotational torque to be generated.

DETAILED DESCRIPTION OF THE PREFERRED EMBODIMENT

Figure 1:
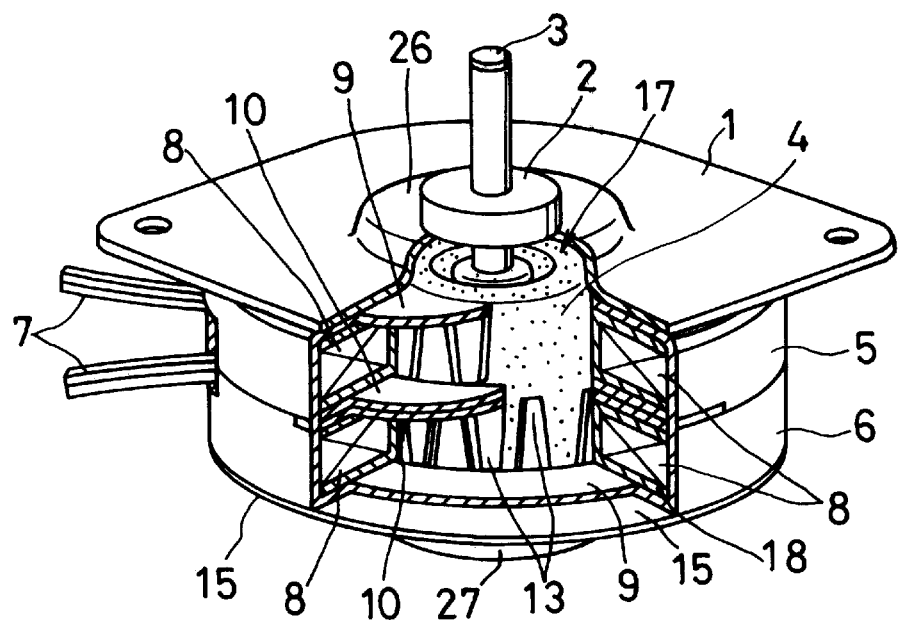
FIG. 1 is a perspective view of a partially broken claw type stepping motor according to a first embodiment of the present invention.

The present invention will be described by way of the preferred embodiments of a two-phase claw pole type stepping motor which is one type of the claw type synchronous motors, with reference to the accompanying drawings.

A first embodiment of the present invention will be described with reference to FIGS. 1 to 5A and 5B.

As shown in FIGS. 1 to 4, the claw pole type stepping motor according to the first embodiment of the present invention is of an inner rotor type and has a pair of flanges 1 and 15 spaced apart from each other in a parallel manner and a rotary shaft 3 rotatably provided in the central portions of the flanges through generally cylindrical bearings 2 and 16. A cylindrical rotor 4 having a multi-pole magnetized permanent magnet and an axis 41 is fixedly and coaxially mounted on the shaft 3 through a cylindrical sleeve 17. The rotor 4 has an upper end 21 and a lower end 22.

Two ring-shaped stator assemblies 5 and 6 are arranged back-to-back and coaxially surround the rotor 4. The stator assembly 5 constitutes an A-phase stator assembly and the stator assembly 6 constitutes a B-phase stator assembly. Both stator assemblies 5 and 6 form a multi-stator assembly 23 having an upper end surface 24 and a lower end surface 25. A coil 8 wound in a U-shaped bobbin 18 is provided in each stator assembly. Lead-off wires 7 are pulled out of the coils 8.

Figure 2:
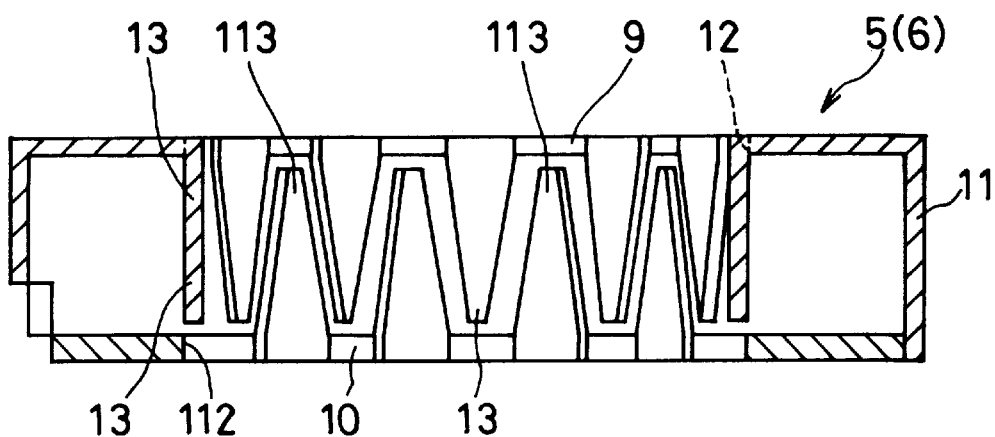
FIG. 2 is a longitudinal cross-sectional view of a phase stator assembly of the motor in FIG. 1.
Figure 3:
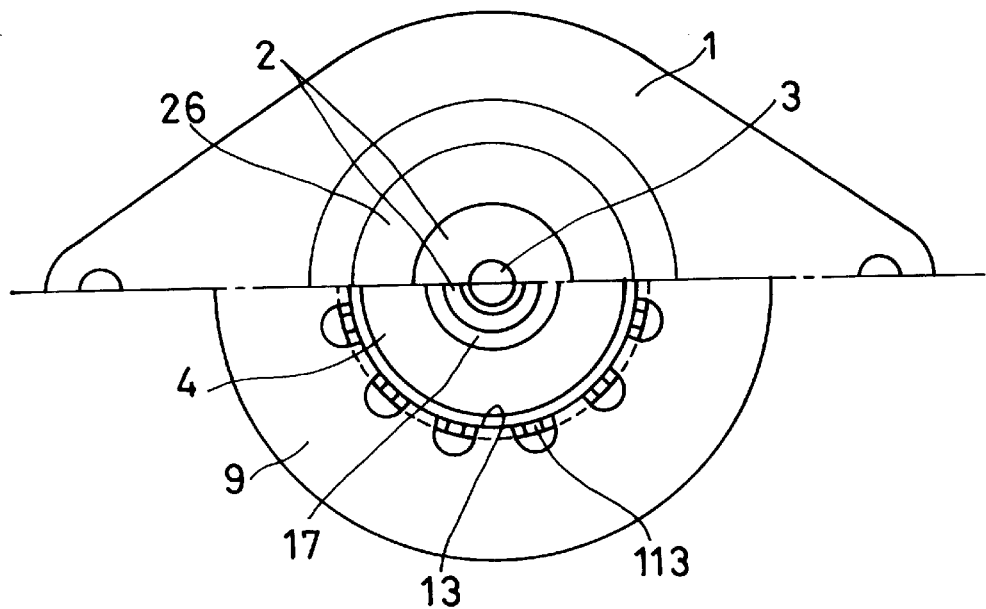
FIG. 3 is a view with its upper half portion showing a plan view of the motor itself in FIG. 1 and with its lower half portion showing a plan view of the motor with a flange removed therefrom.

As shown in FIG. 2, each of the stator assemblies 5 and 6 comprises two stators 9 and 10 arranged in parallel with each other. Each of the stators 9 is formed on its outer edge with a cylindrical wall 11. On each of the circular inner edge 12 of the stator 9 and the circular inner edge 112 of the stator 10 are formed a plurality of substantially isoscecles triangular claw poles 13 and 113 arranged circumferentially at equal intervals.

The claw poles 13 and 113 have their bases formed on the inner edges 12 and 112 of the corresponding stators 9 and 10 and extend therefrom toward the inner edges 112 and 12 of the other stators 10 and 9, respectively.

As shown in FIG. 2, the claw poles 13 of one stator 9 and the claw poles 113 of the other stator 10 are arranged alternately and surround the rotor 4.

Figure 4:
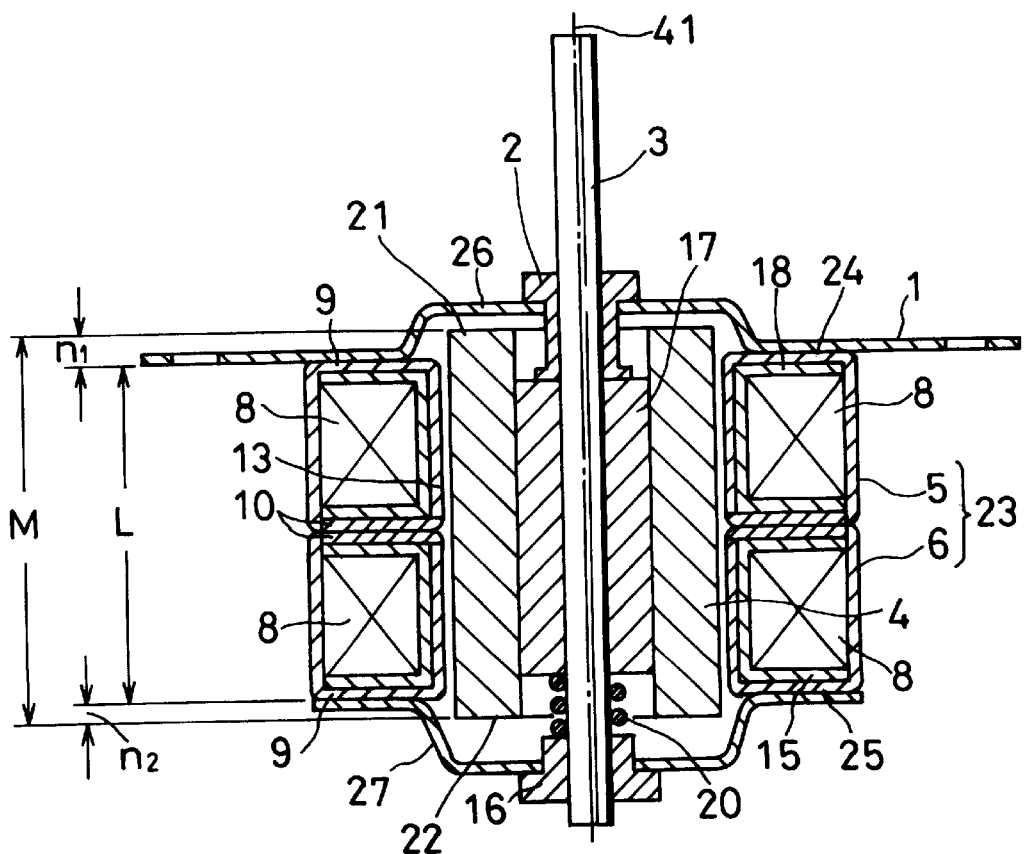
FIG. 4 is a longitudinal cross-sectional view of FIG. 1.

As best shown in FIG. 4, the rotor 4 has a length M which is larger than a length L which is equal to the distance between the upper surface 24 of the upper stator assembly 5 and the lower surface 25 of the lower stator assembly 6, where the distance L is defined as a total thickness. The portion of the upper flange 1 which is disposed above the upper end 21 of the rotor 4 is raised in a cup shape or a dish shape to form a swollen receiving portion 26 and the portion of the lower flange 14 which is disposed under the lower end of the rotor 4 is lowered in a cup shape or a dish shape to form another swollen receiving portion 27. The bearings 2 and 16 are passed through the central portions of the receiving portions 26 and 27 and are fixed thereto.

A cylindrical sleeve 17 is coaxially inserted in the rotor 4 and is fixed thereto. The rotary shaft 3 coaxially extends through the sleeve 17 and is secured thereto. Further, the shaft 3 coaxially passes the bearings 2 and 16 so as to be rotatable with respect thereto.

A compression coil spring 20 is disposed between the lower end of the cylindrical sleeve 17 and the upper end of the lower bearing 16 so that the spring 20 urges the sleeve 17 upward, and the upper end of the sleeve 17 abuts against the lower end of the upper bearing 2 in such a way that the rotor 4 is always disposed at a position in which the upper end 21 of the rotor 4 is disposed slightly above the upper end surface 24 of the multi-stator assembly 23, i.e., by $n_1$ higher than the upper surface 24 and in such a way that the lower end 22 of the rotor 4 is disposed slightly below the lower end surface 25 of the multi-stator assembly 6, i.e., by $n_2$ lower than the lower end surface 25, n1 and n2 being 0.5 mm, for example. In other words, the ends 21 and 22 of the rotor 4 extend beyond the corresponding end surfaces 24 and 25 of the multi-stator assembly 23.

Since the whole length of the rotor 4 always covers the inner peripheral areas of the upper and lower stator assemblies 5 and 6 in this arrangement, no or little magnetic variations occur between the rotor 4 and the stator assemblies 5 and 6, i.e., the multi-stator assembly 23. Therefore, vibration of the motor due to the axial movement of the rotor 4 with respect to the stator assemblies 5 and 6 is prevented.

In addition thereto, vibration of the motor is suppressed by the following feature.

Figure 5A:
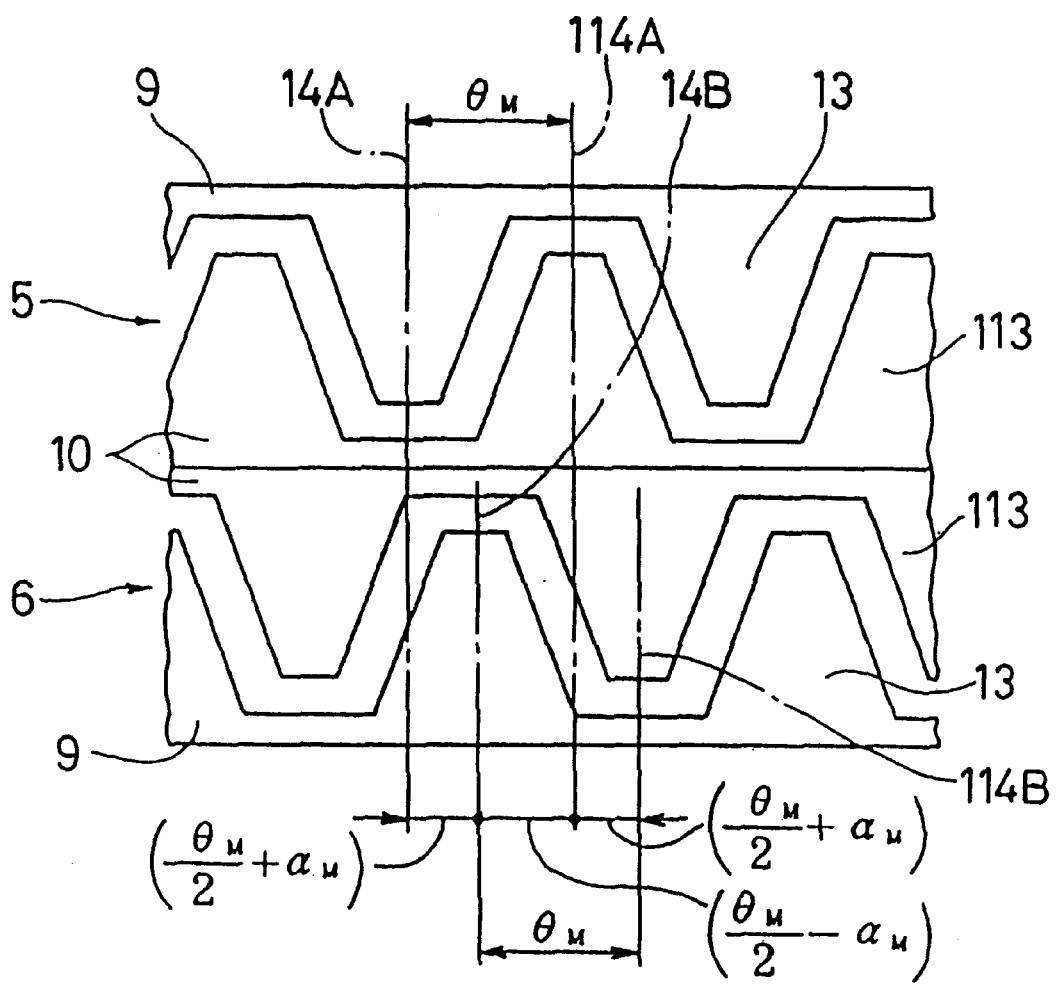
FIG. 5A is a partially enveloping view of the poles of the claw pole of the A-phase stator assembly and the B-phase stator assembly of the motor of FIG. 1, in which a separation angle, a theoretical step angle, a step angle are shown in terms of mechanical angles

FIG. 5A is a partially enveloping view of the combination of the claw poles 13 and 113 of the A-phase stator assembly 5 and the B-phase stator assembly 6, in which a separation angle, a theoretical step angle and a step angle are shown in terms of mechanical angles. In this figure, the center line 14A of each claw pole 13 of the stator 9 at the outside of the A-phase stator assembly and the center line 14B of the corresponding one of the claw poles 113 of the stator 9 at the outside of the B-phase stator assembly 6 define a mechanical angle (a mechanical separation angle) $\psi_M$ extended at the central axes of the stator assemblies 5 and 6 as the centers and equal to $(\theta_M/2+\alpha_M)$. Here, $\theta_M$ is a theoretical mechanical step angle and equal to $360°/N$ (N being the number of steps) and an $\alpha_M$ is a mechanical adjustment angle measured from the mechanical step angle $\theta_M/2$.

When the angle between the center line 14A and the center line 14B is smaller than the theoretical mechanical step angle $\theta_M/2$, the value of $\alpha_M$ is negative. The mechanical separation angle between the center line 114A of each claw pole 113 of the inner stator 10 of the A-phase stator assembly 5 and the center line 114B of the corresponding one of the claw poles 113 of the inner stator 10 of the B-phase stator assembly 6 is also negative in the same way as mentioned above, when the angle between the center line 114A and the center line 114B is smaller than the step angle $\theta_M/2$.

For a two-phase claw pole type synchronous motor, every $\chi_E$ is equal to $(N/4)\cdot\chi_M$, where $\chi_E$, $\chi_M$ and N represent the electrical angle, the mechanical angle and the number of steps, respectively. In this embodiment, N is 48. Thus, $\chi_E$ is equal to $(48/4)\cdot\chi_M$, i.e., $12\cdot\chi_M$.

Figure 5B:
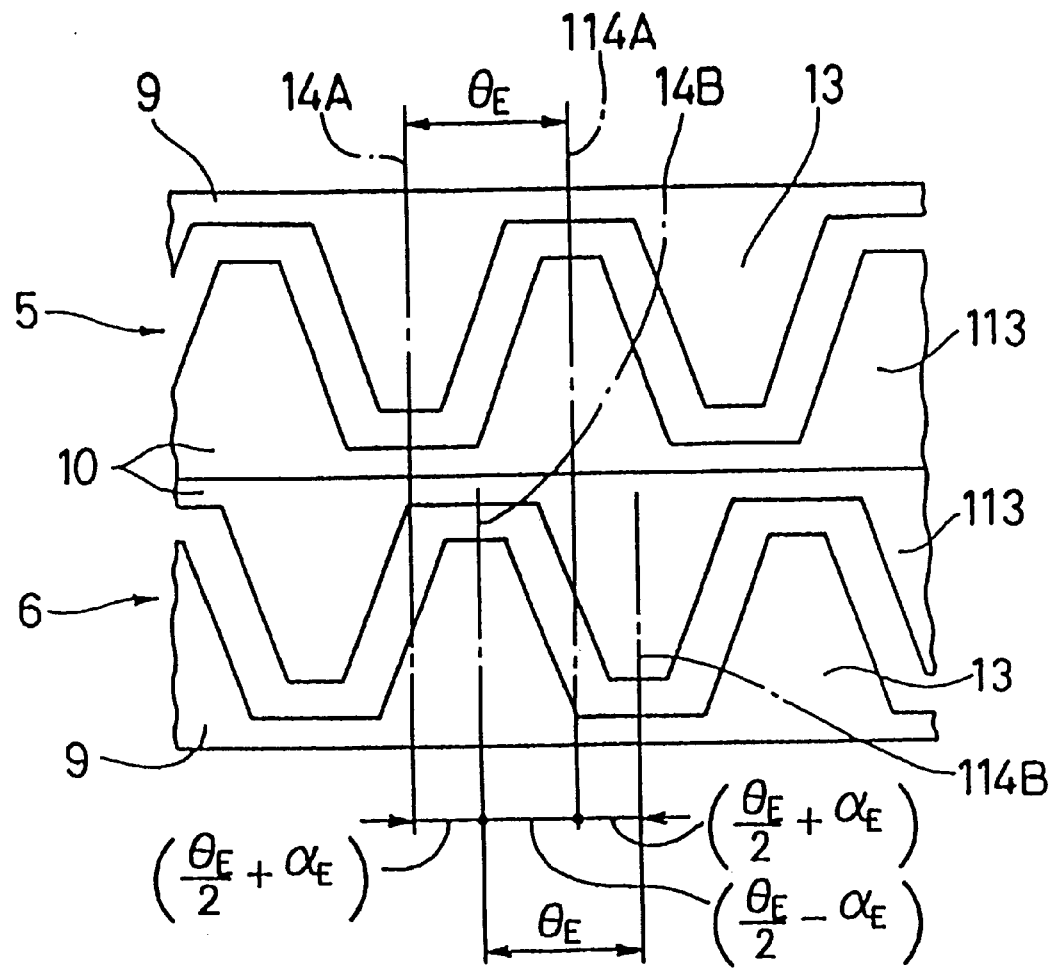
FIG. 5B is a partially enveloping view of the poles of the claw pole of the A-phase stator assembly and the B-phase stator assembly of the motor in FIG. 1, in which a separation angle, a theoretical step angle, step angle are shown in terms of electrical angles.

FIG. 5B is a partially enveloping view of the combination of the claw poles 13 and 113 of the A-phase stator assembly 5 and the B-phase stator assembly 6, in which a separation angle, a theoretical step angle 15 and a step angle, respectively, are shown in terms of electrical angles.

An electrical separation angle $\psi_E$ defined between the center lines 14A and 14B and between 114A and 114B is equal to a theoretical electric phase angle $\theta_E/2$ plus an electrical adjustment angle a E, where $\psi_E$ is equal to 24·$\psi_M$, $\theta_E/2$ is equal to (24·7.50)/2, i.e., 90° and the electrical adjustment angle $\alpha_E$ is equal to 24·$\alpha_M/2$, respectively, in this embodiment.

As mentioned above, the conventional claw pole type stepping motor is manufactured so as to keep the angle between the corresponding claw poles of a pair of stator assemblies to $\phi_M=\theta_M$, i.e., $\alpha_M=0$, in other words, $\phi_E=0$ $_E$, i.e., $\alpha_E=0$ at extremely high accuracy in order to reduce the oscillation. Since, however, the wave form of the sum of squares of the BEMFs excited in the coils at both phases is not linear but is periodically changed and the peak-to-peak value is large as shown by I in FIG. 6, ripples are large, resulting in generation of large vibration upon operation of the motor.

Researches and experiments on the relations between the sum of squares of the BEMFs at both phases and smoothness of rotation of the motor were made by the inventors of the present invention. As a result of them, it was found that the oscillation level is reduced so that it is less than that at the electrical theoretical phase angle $\theta_E/2$ in a range of the oscillation level in which the oscillation had been thought to be increased, in the case where the center lines 14B and 114B of the claw poles 13 and 113 of the B-phase stator assembly 6 advance from the center lines 14A and 114A of the corresponding claw poles 13 and 113 of the A-phase stator assembly 5 by an electrical angle of more than 0° and less than 10° from the electrical phase angle $\theta_E/2$, i.e., in the case where the electrical adjustment angle $\alpha_E$ is more than −10° and less than 0°.

Particularly, it was found that the oscillation level, at which the electrical phase angle advances by approximately 5.9° in an electrical angle (i.e., at the electrical adjustment angle of approximately minus 5.90°), is less by approximately 4.8 dB than that in the case where the phase is unchanged.

Figure 6:
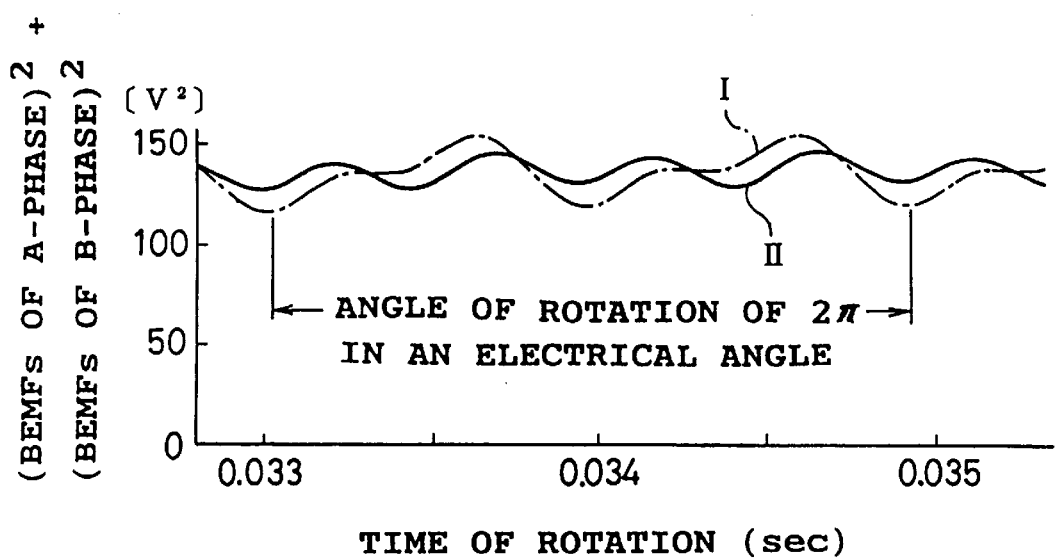
FIG. 6 shows the wave forms of the square sums of the BEMFs of the motor in FIG. 1 and the conventional motor.
Figure 7:
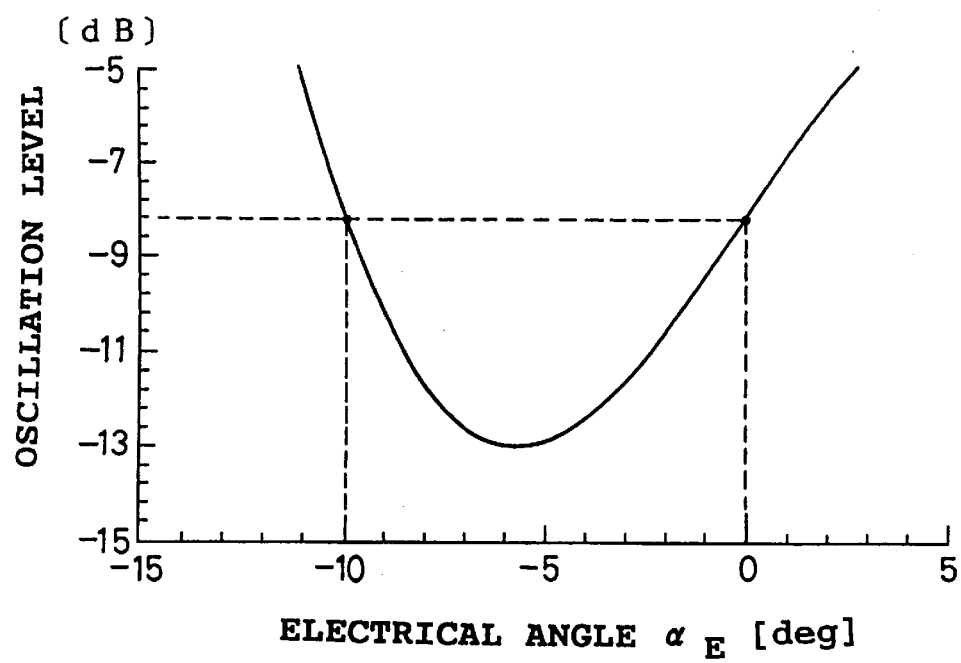
FIG. 7 is a diagram showing a characteristic of oscillation levels with respect to the electric adjustment between the claw poles of the adjacent stator assemblies at the corresponding phases.

As shown by II in FIG. 6, at the electrical adjustment angle of −5°, the wave form represented by the sum of squares of the BEMFs induced in the A-phase and B-phase coils 8 is approximately linear and the peak-to-peak value becomes small so as to make the ripples small, resulting in reduction of the oscillation of the motor. In this case, the value of $\alpha_M$ corresponding to $\alpha_E$ is more than 4·$_E$/N, i.e., 4·(−5°)/N, i.e., −20°/N (−0.417° in this case) and less than 0°.

In consequence, the oscillation of the motor upon operation thereof can be reduced from that of the conventional motor by advancing the electrical phase angle $\phi_E$ by an electrical angle within the above-mentioned range without using other specific means. In other words, a two-phase claw pole type stepping motor can be obtained which can be used on an oscillation sensitive apparatus while the cost of the motor remains inexpensive.

Figure 8:
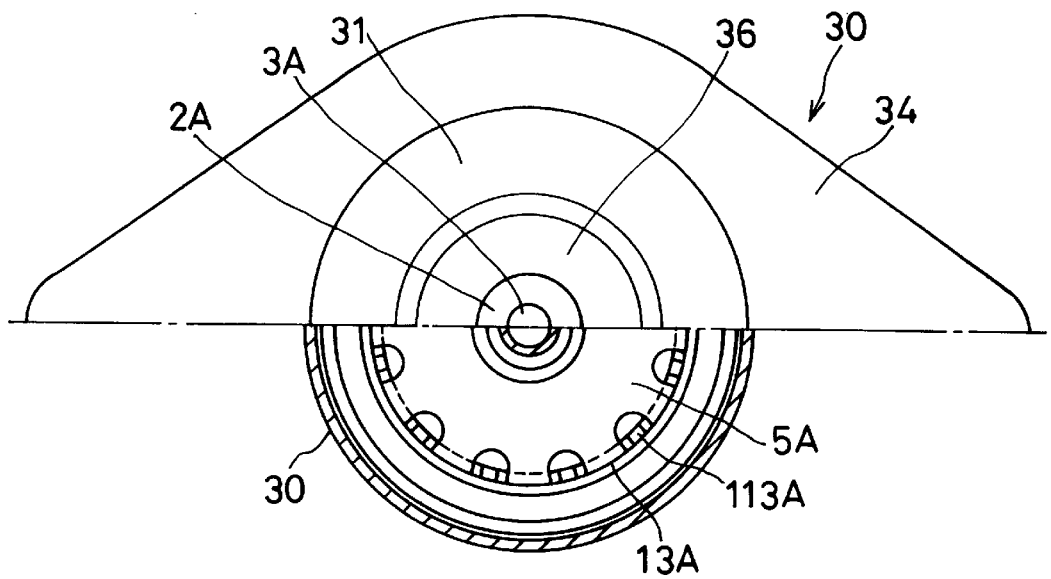
FIG. 8 is a view of a claw-pole type stepping motor according to a second embodiment of the present invention, with the upper half portion showing a plan view of the motor itself and with the lower half portion showing a cross section along Z—Z of FIG. 9.
Figure 9:
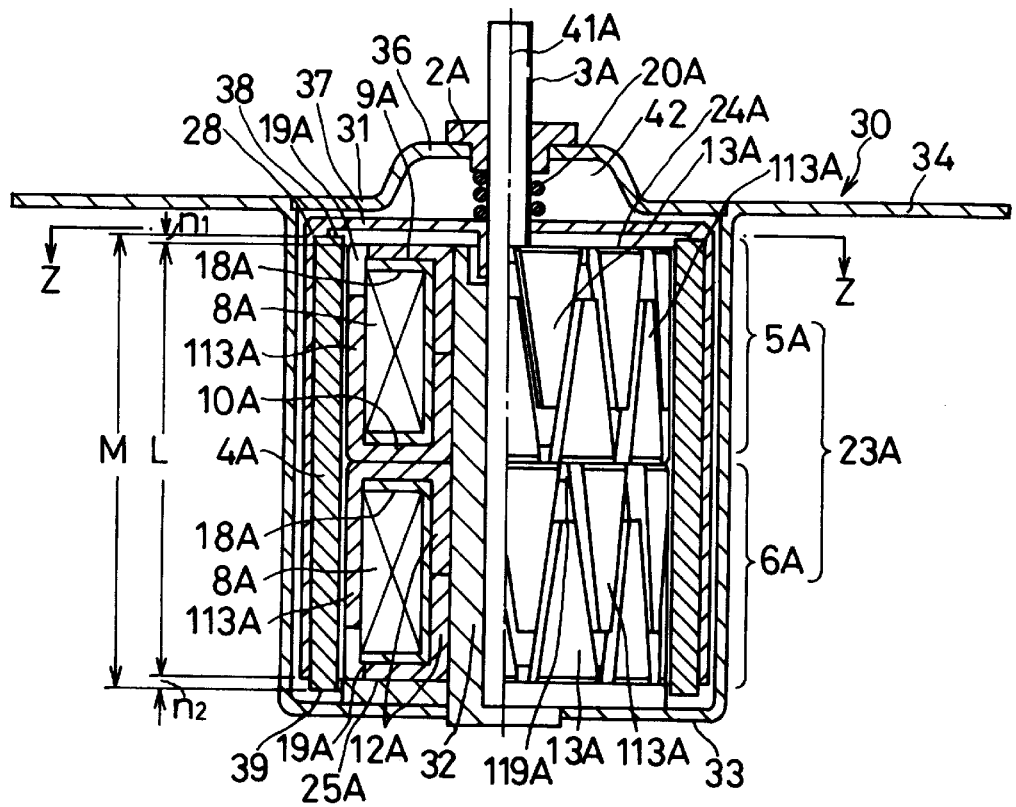
FIG. 9 is a longitudinal cross-sectional view of the claw pole type stepping motor according to the present invention.

In FIGS. 8 and 9 is shown a second embodiment of a two-phase claw pole type stepping motor according to the present invention. This motor is of an outer rotor type and has two ring-shaped stator assemblies, i.e., an A-phase stator assembly 5A and a B-phase stator assembly 6A which are arranged back-to-back and form a multi-stator assembly 23A. Each stator assembly comprises two stators 9A and 10A and each stator has a cylindrical outer wall 12A. The multi-stator assembly 23A has an upper end surface 24A and a lower end surface 25A. The distance between the upper and lower end surfaces 24A and 25A of the multi-stator assembly 23A is shown by L in FIG. 9. A coil 8A is wound in a bobbin 18A having a U-shaped cross section and is disposed between the stators 9A and 10A of each stator assembly.

Claw poles 13A and 113A are formed on the outer edges 19A and 119A of the stators 9A and 10A, arranged circumferentially at equal intervals and extend toward the outer edges 119A and 19A of the opposed stators 10A and 9A. The claw poles 13A and 113A of the stator assemblies 5A and 6A are arranged alternately as in the case of the first embodiment. A hollow cylindrical rotor 4A having a multi-pole magnetized permanent magnet and an axis 41A coaxially surrounds both stator assemblies 5A and 6A.

A housing 30 has a blind-ended cylindrical portion 33 and a flange 34 extending outward from the upper opening of the cylindrical portion 33. The cylindrical portion 33 houses the multi-stator assembly 23A and the rotor 4A. A cylindrical sleeve 32 has a lower end fixed to the central portion of the bottom of the cylindrical portion 33 of the housing 30 so that the sleeve 32 extends coaxially through the cylindrical portion 33 of the housing 30. The stator assemblies 5A and 6A (i.e., the multi-stator assembly 23A) are fixed to the housing 30 through the sleeve 32 and the cylindrical portion 33 to which the sleeve 32 is fixed.

The upper opening of the cylindrical portion 33 of the housing 30 is covered with a cover plate or an end plate 31. The central portion of the cover plate 31 is raised in a cup shape or a dish shape to form an swollen receiving portion 36 defining a space 42 therein. The outer periphery of the cover plate 31 is fixed to the inner edge of the open upper end of the cylindrical portion 33 of the housing 30. A generally cylindrical bearing 2A is fitted on the central part of the swollen receiving portion 36.

A rotary shaft 3A extends through the central hole of the sleeve 32 so as to be rotatable with respect to the sleeve 32. The rotor 4A surrounding the stator assemblies 5A and 6A is fixed to the shaft 3A by means of a generally disc-shaped connection member 37 having a central hole with its inner peripheral wall fixed to the shaft 3A and an outer peripheral portion coaxially fixed to the upper end of the rotor 4A in such a way that the rotor 4A rotates together with the shaft 3A.

In the receiving portion 21 of the cover 31, a compression spring 20A is disposed between the lower end of the bearing 2A and the upper surface of the connecting member 31 and urges the rotor 4A and the sleeve 32 downward.

The rotor 4A has a length M which is larger than the total distance L of the multi-stator assembly 23A. The rotor 4A is provided such that the upper end 38 of the rotor 4A is always disposed at the position slightly above the upper end surface 24A of the multi-stator assembly 23A, i.e., by n1 higher than the upper end surface 38, and the lower end 39 of the rotor 4A is always disposed slightly below the lower end surface 25A of the multi-stator assembly 23A, i.e., by $n_2$ lower than the lower end surface 25A, n1 and n2 being 0.5 mm, for example. In other words, the ends 38 and 39 of the rotor 4A extend beyond the corresponding end surfaces 24A and 25A of the multi-stator assembly 23A. Between the upper surface 24A of the multi-stator assembly 23A and the lower surface of the cover 31 is provided a space 43 for allowing the axial movement of the rotor 4A.

As the rotor 4A rotates, it moves axially. Since, however, the rotor 4A always covers the inner peripheral areas of the upper and lower stator assemblies 5A and 6A under the biasing force of the 20 compression coil spring 20A, no or little magnetic variations occur between the rotor 4A and the stator assemblies 5A and 6A, i.e., the multi-stator assembly 23A. Therefore, vibration of the motor due to the axial movement of the rotor 4A with respect to the stator assemblies 5A and 6A is prevented. FIGS. 5A, 5B, 6 and 7 are also applied to the second embodiment.

The present invention can be applied not only to a three or more phase claw pole type stepping motor but also to a motor including a multi-phase claw pole type motor.

Since the electrical separation angle defined between the center lines of the corresponding claw poles of the adjacent stator assemblies is set so that an electrical adjustment angle is within a predetermined electrical angular range, the vibration of the motor according to the present invention is reduced. Thus, the motor of the present invention can be manufactured at a low cost without using the other specific means and can be used on an apparatus which requires low vibration. In particular, a motor performing microstepping drive has a remarkable vibration reducing efficiency.

What is claimed is:

1. A claw pole type synchronous motor comprising:

a rotor having two ends and an axis, and having a multi-pole magnetized permanent magnet;

a plurality of stator assemblies having cylindrical inner peripheral areas and arranged back-to-back one after another and coaxial with said rotor so as to form a multi-stator assembly having two end surfaces defining a total thickness therebetween;

claw poles formed so as to face said rotor and arranged in parallel with said axis of said rotor on each of said stator assemblies and circumferentially at equal intervals;

said rotor having a length larger than said total thickness of said multi-stator assembly and disposed in such a way that each of said two ends of said rotor always extend from the corresponding one of said end surfaces of said multi-stator assembly; and an electrical separation angle of $(\theta_E/2+\alpha_E)$ is defined between center lines of the corresponding claw poles of said stator assemblies in such a way that $\theta_E/2$ is an electrical angle of 90° and $\alpha_E$ is in an electrical angle range of $-10°<\alpha_E<0°$, for reduction of vibration of said motor.

2. The motor according to claim 1, wherein said rotor is urged by a compression coil spring such that said rotor always covers said cylindrical inner peripheral areas of said stator assemblies.

3. The motor according to claim 2, wherein said $\alpha_E$ is between an electric angle of −4° and an electrical angle of −7°.

4. The motor according to claim 1, wherein said $\alpha_E$ is between an electric angle of −4° and an electrical angle of −7°.

5. The motor according to claim 1, wherein said stator assemblies comprise an A-phase stator assembly and a B-phase stator assembly.

6. The motor according to claim 5, wherein said motor is of a microstepping drive type.

7. A claw pole type synchronous motor comprising:

a cylindrical sleeve having two ends;

a shaft coaxially and fixedly inserted in said sleeve;

a rotor having two ends, an axis and a multi-pole magnetized permanent magnet;

a plurality of stator assemblies provided adjacent to each other and coaxial with said rotor, and having a total thickness;

claw poles formed so as to face said rotor and arranged in parallel with said axis of said rotor on each of said stator assemblies and circumferentially at equal intervals;

said rotor having a length larger than said total thickness of said stator assemblies;

two flanges spaced in parallel with each other and holding said stator assemblies therebetween so as to face the corresponding ends of said shaft;

two bearings each rotatably provided on a respective one of said flanges and having one end;

a compression spring provided between said end of one of said bearings and the corresponding end of said sleeve, for biasing said sleeve from said end of one of said bearings toward said end of the other bearing and making said end of said other bearing abut against said end of said other bearing, for always holding said sleeve with said two ends of said rotor disposed beyond said stator assemblies; and an electrical separation angle of $(\theta_E/2+\alpha_E)$ is defined between center lines of corresponding claw poles of said adjacent stator assemblies in such a way that $\theta_E/2$ is an electrical angle of 90° and $\alpha_E$ is in an electrical angle range of $-10°<\alpha_E<0°$, for reduction of vibration of said motor.

8. The motor according to claim 7, wherein each of said flanges has an swollen portion which receives corresponding one of said bearings.

9. The motor according to claim 7, wherein said $\alpha_E$ is between an electric angle of −4° to −7°.

* * * * *